United States Patent
Hirzmann

(10) Patent No.: US 6,659,498 B2
(45) Date of Patent: Dec. 9, 2003

(54) STEERING WHEEL WITH MOVABLE AIRBAG MODULE

(75) Inventor: Guido Hirzmann, Sailauf (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 10/200,533

(22) Filed: Jul. 22, 2002

(65) Prior Publication Data

US 2003/0025308 A1 Feb. 6, 2003

(30) Foreign Application Priority Data

Aug. 1, 2001 (DE) .......................... 201 12 719

(51) Int. Cl.7 .............................. B60R 21/16; H01H 9/00
(52) U.S. Cl. ..................................... 280/731; 200/61.54
(58) Field of Search ........................ 280/728.2, 731, 280/743.1; 200/61.54

(56) References Cited

U.S. PATENT DOCUMENTS

| | | | | |
|---|---|---|---|---|
| 5,368,327 A | * | 11/1994 | Shiraki et al. ........... | 280/728.2 |
| 5,650,600 A | * | 7/1997 | Walters ................... | 200/61.54 |
| 6,211,476 B1 | * | 4/2001 | Edie ........................ | 200/61.08 |
| 6,364,344 B2 | * | 4/2002 | Hudd et al. .............. | 280/728.2 |
| 6,426,473 B1 | * | 7/2002 | Derrick et al. ........... | 200/61.54 |

FOREIGN PATENT DOCUMENTS

| | | |
|---|---|---|
| DE | 19742587 A1 | 4/1998 |
| DE | 19720149 A1 | 11/1998 |
| DE | 29816925 U1 | 1/1999 |

* cited by examiner

*Primary Examiner*—Robert P. Swiatek
(74) *Attorney, Agent, or Firm*—Tarolli, Sundheim, Covell & Tummino L.L.P.

(57) ABSTRACT

A steering wheel comprises a steering wheel body, an airbag module movably mounted on the steering wheel body and at least one guide that is connected to the airbag module as well as to the steering wheel body, the airbag module being adapted to be moved over a displacement path relative to the steering wheel body for purposes of actuating a horn. The guide has at least two carriers that are arranged transversely to the direction of the displacement path and parallel to each other as well as offset in the direction of the displacement path. Further, the guide has a first end that is connected to the airbag module and a second end that is connected to the steering wheel body.

13 Claims, 2 Drawing Sheets

STEERING WHEEL WITH MOVABLE AIRBAG MODULE

TECHNICAL FIELD

The invention relates to a steering wheel comprising a steering wheel body, more particularly to a vehicle steering wheel.

BACKGROUND OF THE INVENTION

Steering wheels with airbag modules of the "floating horn" type, in which the entire airbag module is moved in order to make horn contact, have to fulfill high demands in terms of esthetics and functionality. In order to be able to keep the gap between the airbag module and the steering wheel body as small as possible, it is desirable for the airbag module to move in the steering wheel body without any lateral play if at all possible.

BRIEF SUMMARY OF THE INVENTION

The steering wheel according to the invention comprises a steering wheel body, an airbag module movably mounted on the steering wheel body and at least one guide that is connected to the airbag module as well as to the steering wheel body, the airbag module being adapted to be moved over a displacement path relative to the steering wheel body for purposes of actuating a horn. The guide has at least two carriers that are arranged transversely to the direction of the displacement path and parallel to each other as well as offset in the direction of the displacement path. Further, the guide has a first end that is connected to the airbag module and a second end that is connected to the steering wheel body.

The design of the guide makes it possible to move a component along an orbit, the orientation of the component remaining unchanged. The displacement path traversed by the airbag module over the path needed to actuate the horn can be considered to be approximately linear. The attachment to two carriers prevents tipping of the module during the actuation of the horn. The use of such a guide ensures that the movement of the airbag module in the steering wheel body can be achieved virtually free of play, while also entailing low production and material costs.

In a preferred embodiment, the guide is rigidly connected to the steering wheel body as well as to the airbag module and is designed to be so elastic that it is elastically bent for purposes of actuating the horn. In this embodiment, it is possible to completely dispense with joints, which even further reduces any play and lowers the production costs.

The carriers are preferably made of sheet metal strips. In order to be able to optimally utilize the elasticity of the sheet metal strips, they are advantageously arranged in such a way that their broadsides face each other and face in the direction of the displacement path of the airbag module.

In another embodiment of the invention, the carriers each have two legs that run towards each other at approximately a right angle. These carriers, which are bent at a right angle, can, for example, surround the airbag module on the outside, thus allowing an optimal adaptation to the small space in the steering wheel body.

Preferably, the guide is formed in that the carriers are connected by partial encapsulation by means of injection molding with plastic. This is advantageously done in that the longitudinal ends of the parallel carriers are connected to each other by means of one bridge each and are held at a distance from each other. It is especially advantageous if the bridges are injection-molded plastic parts in which the ends of the carriers are embedded. This is a simple and easy way to produce play-free guides for the airbag module.

The embodiment just described is very well suited for attaching the guide to a first bridge on the steering wheel body and/or to a second bridge on the airbag module. The bridges can be configured in such a way that they have attachment means.

In a preferred embodiment of the invention, in addition to the guide, a return means is provided that moves the airbag module back into its starting position after it has been displaced. As an alternative or in addition, it can be provided that, through a displacement of the airbag module, a return force is generated in the guide that ensures that the airbag module is moved back into its starting position after it has been displaced. The guide then simultaneously fulfills the function of a return element.

When the guide exerts a prestress on the airbag module in the non-actuated starting position of the airbag module, it is easily possible to avoid unwanted movement or, for example, rattling of the airbag module in the steering wheel body.

Another embodiment of the invention provides that the two carriers form a parallelogram guide for the airbag module. In this case, the carriers are each attached to the airbag module and to the steering wheel body so as to swivel.

DETAILED DESCRIPTION OF PREFERRED EMBODIMENTS

Figure 1:
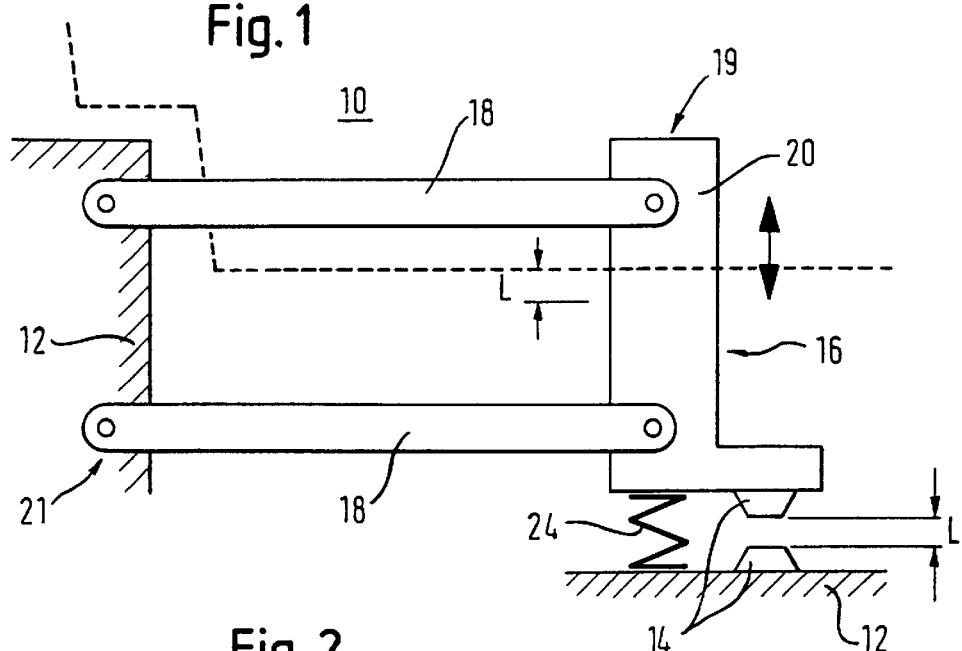
FIG. 1 is a schematic representation of a steering wheel according to the invention in a first embodiment.

FIG. 1 is a schematic representation of a first embodiment of the invention. An airbag module 10 is movably mounted in a steering wheel body 12, and this module is part of a steering wheel, preferably its hub region. The displacement path L of the airbag module 10 corresponds to the distance between two horn contacts 14. The direction of the displacement path L is indicated by an arrow. The displacement direction is aligned in such a way that the airbag module 10 can be pressed down into the steering wheel body 12 by the driver of a vehicle in order to actuate the horn.

A guide, which is formed in this embodiment as a parallelogram guide 16 and which has two carriers 18, connects the steering wheel body 12 with the airbag module 10. The carriers 18 are arranged perpendicular to the displacement path, parallel to each other and staggered with respect to each other in the direction of the displacement path. At a first end 19 of the parallelogram guide 16, the rotatably mounted carriers 18 are connected to a bridge 20 which, in turn, is attached rigidly, i.e. not rotatably or displaceably, to the airbag module 10 or else they are part thereof. At a second end 21 of the parallelogram guide 16, the other ends of the carrier 18 are rotatably mounted on the steering wheel body 12.

Over the displacement path L, which is in the millimeter range, when the airbag module 10 is displaced, it executes a movement that is approximately linear as a result of the parallelogram guide 16. The design of the guide allows the airbag module 10 to be guided virtually play-free.

In the example shown here, the horn contact 14 is arranged on the bridge 20. The arrangement of the horn contact, however, can be adapted to the particular circumstances in any desired manner.

In order to move the airbag module 10 into its starting position, which is shown in FIG. 1, after it was displaced in the direction of the displacement path in order to actuate the horn, a return element, in this case a return spring 24, is arranged between the bridge 20 and the steering wheel body 12. Preferably, this return spring 24 generates a prestress that holds the airbag module 10 in its non-actuated starting position in order to prevent rattling or inadvertent actuation of the horn.

The embodiments of the invention shown in FIGS. 2 through 6 differ fundamentally from the first embodiment in that the ends of the carriers 18 are not rotatably mounted. The ends of the guide 160 shown here and thus the ends of the carrier 18 are connected rigidly to the steering wheel body 12 on the one hand, and rigidly to the airbag module 10 on the other hand. A displacement of the airbag module 10 is made possible by the intrinsic elasticity of the carriers 18, which are bent elastically when the horn is actuated, in order to allow the airbag module 10 to traverse the displacement path L. The carriers 18 are preferably sheet metal strips that are arranged in the guide 160 in such a way that their broadsides face each other and face in the direction of the displacement path L, whereby the intrinsic elasticity of the material allows the carrier 18 to bend.

Figure 2:
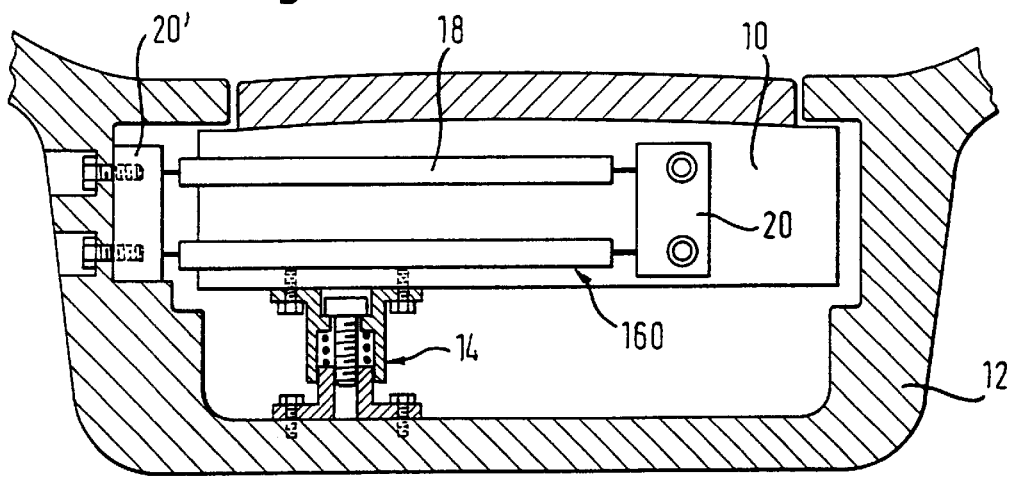
FIG. 2 is a schematic representation of a second embodiment of a steering wheel according to the invention.
Figure 3:
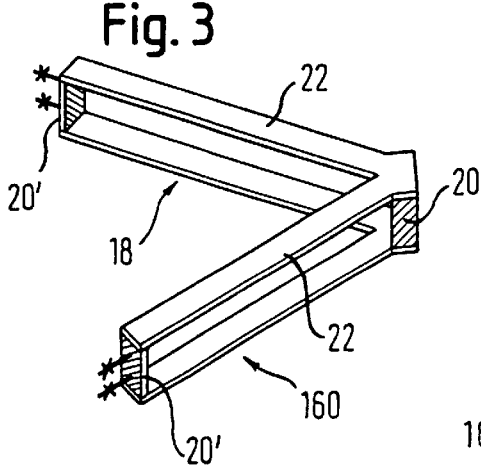
FIG. 3 is a guide for use in a steering wheel according to the invention.
Figure 4:
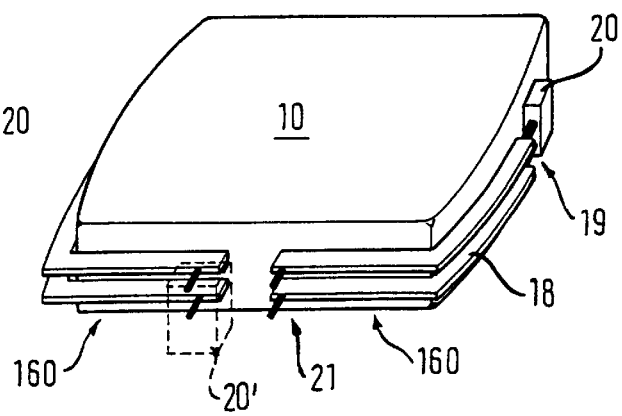
FIG. 4 is an assembly consisting of an airbag module and a guide element for use in a steering wheel according to the invention.

In the embodiments shown in FIGS. 2 through 4, the carriers 18 of the guide 160 are each bent in such a way that each carrier 18 has two legs 22 that approximately form a right angle. The carriers 18 lie parallel to each other and are connected to each other by bridges 20, 20' located at their ends. The bridges simultaneously hold the carriers 18 at a distance from each other. At the vertex of the angle, the two carriers 18 can be connected to each other by another bridge 20. Moreover, the bridges 20, 20' provide attachment means to connect the guide 160 to the steering wheel body 12 (via bridges 20') or to the airbag module 10 (via bridge 20). This is shown schematically in FIG. 3.

In this case as well, the guidance by two parallel carriers that are at a distance from each other ensures a virtually linear movement of the airbag module without lateral play.

The guide 160 is preferably produced in that the sheet metal strips of the carriers 18 are made by shaping sheet metal and then encapsulated in an injection-molding process with the bridges 20, 20'.

The airbag module 10 is surrounded by two guides 160 arranged in a mirror-image with respect to each other, as shown in FIG. 4.

The horn contacts 14 in this example are formed between the bottom of the airbag module 10 and the steering wheel body 12.

Figure 5:
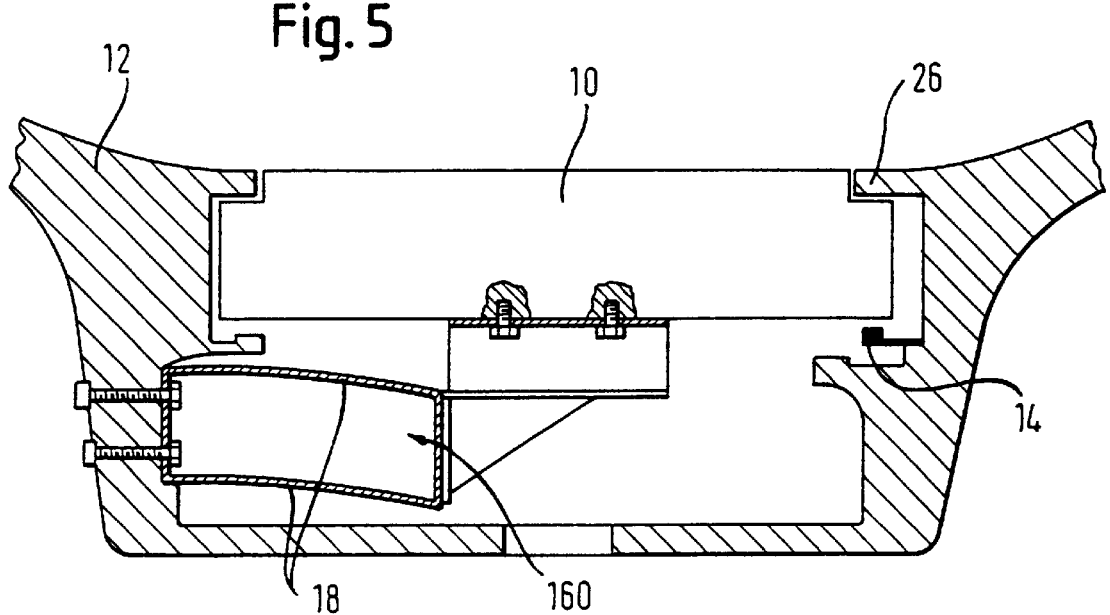
FIG. 5 is a steering wheel according to the invention in another embodiment.

In the embodiment shown in FIG. 5, the guides 160 formed according to the example of FIG. 3 are arranged in such a way that the airbag module 10 lies on the upper carrier 18.

The guide 160 is slightly prestressed in the starting position shown in FIG. 5, so that the airbag module 10 is held against projections 26 in the steering wheel body 12. In order to actuate the horn contact 14, the airbag module 10 is pressed down against the resistance of the guide 160. When the airbag module 10 is released again, the prestress of the guide 160, which is generated by the elastic bending of the carriers 18, ensures that the airbag module 10 is moved back into its starting position. In this case, the guide 160 simultaneously serves as the return element.

Figure 6:
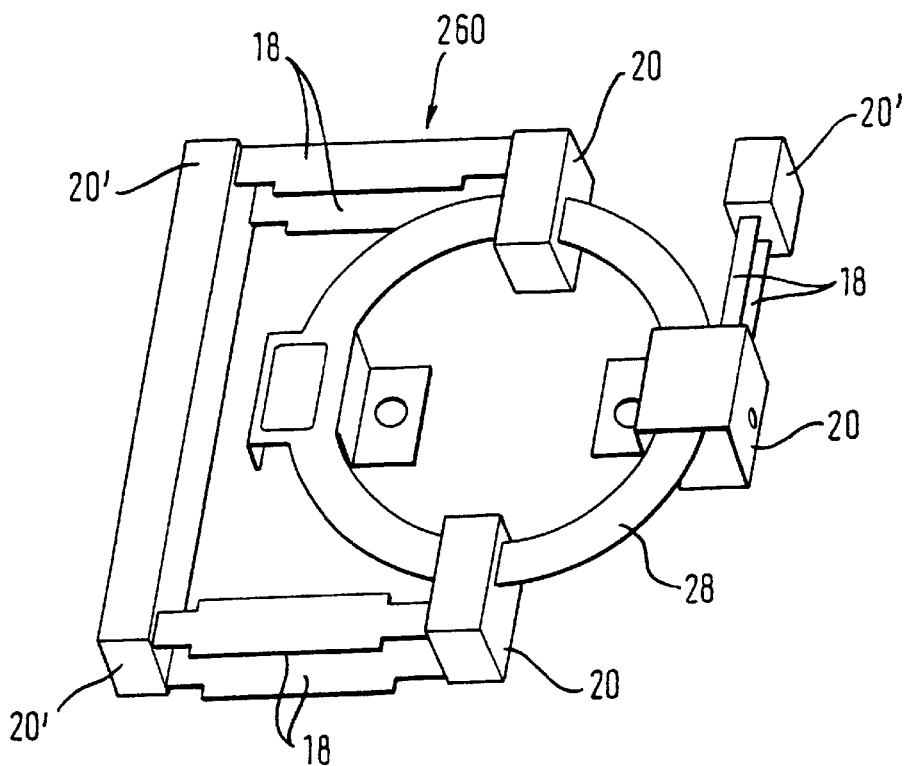
FIG. 6 is a guide element for use in a steering wheel according to the invention according to a fourth embodiment.

The guide 260 shown in FIG. 6 has three pairs of carriers 18. The ends of the carriers 18, as described above, are connected by bridges 20, 20' in which they are also held at a distance from each other. Three of the bridges 20 are rigidly connected with a ring-shaped holder 28 for an airbag module. The other bridges 20', which receive the ends of the carriers 18 that are not connected to the holder 28, are rigidly connected to a steering wheel body 12 (not shown here). In order to simplify the manufacturing, one of the bridges 20 can be configured in such a way that it connects the ends of two pairs of carriers to each other.

Two of the pairs of carriers 18 engage the ring-shaped holder 28 at diametrically opposed places, whereas the third pair of carriers is connected to the holder 28 via its bridge 20, offset by 90° thereto. The lateral play of the airbag module is even further reduced in this embodiment.

What is claimed is:

1. A steering wheel comprising
   a steering wheel body,
   an airbag module movably mounted on said steering wheel body and
   at least one guide that is connected to said airbag module as well as to said steering wheel body,
   said airbag module being adapted to be moved over a displacement path (L) relative to said steering wheel body for purposes of actuating a horn,
   said guide having at least two carriers that are arranged transversely to said direction of said displacement path (L) and parallel to each other as well as offset in said direction of said displacement path, and
   said guide having a first end that is connected to said airbag module and a second end that is connected to said steering wheel body.

2. The steering wheel according to claim 1, wherein said guide is rigidly connected to said steering wheel body as well as to said airbag module and is designed to be so elastic that it is elastically bent for actuating said horn.

3. The steering wheel according to claim 1, wherein said carriers are made of sheet metal strips.

4. The steering wheel according to claim 3, wherein said sheet metal strips have broadsides and are arranged in said guide in such a way that their broadsides face each other and face in said direction of said displacement path (L).

5. The steering wheel according to claim 1, wherein said carriers each have two legs that run towards each other at approximately a right angle.

6. The steering wheel according to claim 1, wherein said guide is formed in that said carriers are connected to each other by partial encapsulation by means of injection molding with plastic.

7. The steering wheel according to claim 1, wherein said parallel carriers have longitudinal ends which each are connected to each other by means of a bridge and are held at a distance from each other.

8. The steering wheel according to claim 7, wherein said bridges are injection-molded plastic parts in which said ends of said carriers are embedded.

9. The steering wheel according to claim 7, wherein said guide is attached to at least one of a first bridge on said airbag module and a second bridge on said steering wheel body.

10. The steering wheel according to claim 1, wherein, in addition to said guide, a return means is provided that moves said airbag module back into a starting position after it has been displaced.

11. The steering wheel according to claim 1, wherein, through a displacement of said airbag module, a return force is generated in said guide that ensures that said airbag module is moved back into its starting position after it has been displaced.

12. The steering wheel according to claim 1, wherein said guide exerts a prestress on said airbag module in a non-actuated starting position of said airbag module (10).

13. The steering wheel according to claim 1, wherein said two carriers (18) form a parallelogram guide (16) for said airbag module (10).

* * * * *